United States Patent [19]

Heian

[11] 3,986,819

[45] Oct. 19, 1976

[54] GRATE PREHEATER KILN SYSTEM

[75] Inventor: Glenn A. Heian, Franklin, Wis.

[73] Assignee: Allis-Chalmers Corporation, Milwaukee, Wis.

[22] Filed: May 13, 1975

[21] Appl. No.: 577,031

[52] U.S. Cl. .................................. 432/14; 106/100; 106/103; 432/106

[51] Int. Cl.[2] ........................ F27B 15/00; C04B 7/02

[58] Field of Search ................. 432/14, 16, 17, 106; 106/100, 103

[56] References Cited

UNITED STATES PATENTS

| | | | |
|---|---|---|---|
| 1,468,168 | 9/1923 | Pike | 432/106 |
| 2,214,345 | 9/1940 | Pike | 106/100 |
| 2,993,687 | 7/1961 | Gieskieng | 106/100 |
| 3,782,888 | 1/1974 | Cnare | 432/14 |

*Primary Examiner*—John J. Camby
*Attorney, Agent, or Firm*—Robert C. Jones

[57] ABSTRACT

Grate burner fuel supplies additional heat to the grate preheater for accomplishing more calcining. A cooler recoup system directs cooler recoup air to the grate fuel burner as preheat combustion air for the fuel burner. The cooler recoup air is also directed to the grate preheat zone as preheated combustion air for fuel in the pellet bed. Cooler recoup air is also directed to the drying zone. The cooler recoup system is controlled so that excess cooler recoup air is bypassed to the waste gas system to dump excess air. Also, a cooler recoup fan speed or damper is regulated to control kiln firing hood pressure by varying the flow. In addition, there is provided the cooler recoup excess air bypass damper for controlling duct pressure to stabilize air flow in the system by varying the flow to the waste gas system. The disclosed apparatus operated according to the method herein disclosed provides improved fuel economy, more effective control and reduction in waste gas, thus reducing heat consumption to provide improved fuel economy with better control of the preheating and drying operation.

19 Claims, 4 Drawing Figures

GRATE PREHEATER KILN SYSTEM

BACKGROUND OF THE INVENTION

The present invention relates to an apparatus for heat treating mineral ore material and, in particular, to systems which have a series-flow arrangement, a preheater having at least two stages for drying and preburning material, a kiln and a cooler.

U.S. Pat. No. 2,466,601 discloses a system in which minerals are deposited on a traveling grate and carried through a drying chamber, a preburning chamber, and then are deposited in a rotary kiln for final burning. Hot gases in the kiln heat materials to high temperatures and then pass from the kiln to preburn and then dry the material before passing up a stack at relatively low temperatures. A number of methods for burning a number of materials have been successfully commercialized with such equipment. Iron ore, limestone, and limestone with clay are a few examples of such materials; and examples of such methods are disclosed not only in U.S. Pat. No. 2,466,601 but also in U.S. Pat. No. 2,580,235; U.S. Pat. No. 2,925,336; U.S. Pat. No. 3,110,483; U.S. Pat. No. 3,110,075; U.S. Pat. No. 3,313,534; U.S. Pat. No. 3,416,778; U.S. Pat. 3,653,645; and U.S. Pat. No. 3,671,027. One problem involved in the operation of a system as disclosed in the aforementioned U.S. Pat. No. 2,466,601 is that of obtaining proper thermodynamic balance of heat inputs among the drying, preburning and final heating stages. This problem arises because for each material there are three requirements that establish desired temperatures within such systems. The first requirement is that for each material there is a known or ascertainable heat input and temperature level to which the material must be finally heated in the rotary kiln. The second requirement is that each material also has a known or ascertainable temperature level and total heat input that is necessary to achieve the desired preburn. The material is exposed to much higher temperatures in the kiln. The third requirement is that each material also has a known or ascertainable desired maximum gas temperature for drying the material so that water vapor is not produced so rapidly that the material breaks into particle sizes so small that excessive dust is created. Thus, a material requiring a relatively low drying temperature to prevent particle break-off will require a relatively large volume of gas to completely dry the material, and a material that can tolerate a relatively high drying temperature may require a relatively small volume of drying gases.

Although some materials burn with partial exothermic reactions, it is nevertheless true for all materials that the temperature and volume of the gases that perform the final heating, and therefore determine the size of the kiln, are determining factors as to the temperature and volume of gases discharged from the kiln for preburning and drying material on the grate. Therefore, the degree to which the second requirement is achieved affects the degree to which the first and third requirements can be achieved.

A problem of proper thermodynamic balance between the drying, preburning and final heating stages is created because the gas flow begins with a specific volume of preheated gas from the cooler mixing with burning fuel in the kiln to meet the first requirement, and it is difficult with prior art processes to be sure that the volume and temperature of the gases finally reaching the drying chamber are what is needed to meet the third requirement without providing the kiln that is oversized and without wasting heat from one or more stacks to atmosphere.

The aforesaid U.S. Pat. No. 3,313,534 discloses a system comprising a two-stage cooler with preheated air from the first cooler stage passing into the kiln and air from the second stage discharged to atmosphere as waste heat. An auxiliary burner over the grate and a bypass are provided for some of the gas from the kiln to bypass directly to the drying chamber. With such a system, a regulated quantity of kiln gas that has not passed through material in the preheat chamber may be mixed with gas that has passed through the material in the preheat chamber and the mixture passed through material in the drying chamber. Although this system achieves proper thermodynamic balance, it requires more fuel and a kiln which is larger in diameter than is required for a system according to the present invention for a reason that will appear and be explained as this description of prior art proceeds.

U.S. Pat. No. 2,214,345 and the aforesaid U.S. Pat. No. 2,580,235 disclose bypassing preheated air from the cooler around the kiln and preburn chambers to a drying chamber, and U.S. Pat. No. 2,580,235 additionally discloses one embodiment in which kiln gas can be also bypassed to a drying chamber without passing through material in the preburn chamber. However, such systems also require oversized kilns for a reason that will now be explained. Oversized kilns are required because at start-up and before hot pellets reach the cooler, the cooler provides no heat and all heat needed for the chambers over the grate must come from gases passing through the kiln. The kiln must, accordingly, be sized to accommodate the greater temporary gas flow until hot pellets reach the cooler where some of their heat can be recovered and bypassed around the kiln to the chambers over the grate.

The aforesaid U.S. Pat. Nos. 2,214,345; 3,416,778; and 3,653,645, in addition to U.S. Pat. No. 3,513,534, also disclose burners over a grate for aiding to achieve proper preburning on a grate and ahead of the kiln. However, the burner over the grates in U.S. Pat. No. 2,214,345 does not in any way affect the temperature or volume of gases used for drying, and therefore offers no solution to the problem of material being insufficiently dried and entering the second treatment chamber too wet, during start-up operation before hot material has reached the cooler where thermal energy can be transferred to gases and used for drying. The burners over the grate in U.S. Pat. Nos. 3,313,534; 3,416,778; and 3,653,645 can affect the temperature of gases used for drying, but after pellets begin to pass from the drying chamber into the preburning chamber, the preburning operation utilizes heat which is therefore no longer available for the drying operation, and such systems, therefore, also require oversized kilns or overfiring the burners over the grate. Overfiring the above grate burners in the preburn chamber merely to provide excess heat for drying operations is undesirable because so doing can heat the upper layers of pellets in the preburn chamber beyond the preburn desired before pellets begin to tumble through the kiln.

In U.S. Pat. No. 3,782,888, provisions are made for recouping heat from the cooler by preheating air in a second stage of the cooler, bypassing such preheated air around the kiln, at least around the preburn chamber over a grate which is adjacent the kiln. The invention is characterized by the provision of a heater that can be operated to inject thermal energy into the air stream from the second stage of the cooler that bypasses the kiln and is used for drying operations, at least during start-up when hot material has not yet progressed to the second stage of the cooler. The air heater for cooler gases bypassing the kiln to a drying chamber can, according to the patent, be utilized with a bypass discharge gas around the preburn zone and with two-stage drying in a manner that will provide for a smaller sized kiln.

The present invention is directed to the problem of reducing kiln size and fuel requirements relative to tonages of material treated and providing controlled thermodynamic balance in such systems by the utilization of kiln bypass gases for operation according to a method that will be described. In the present process, the system starts at a reduced capacity until such time as hot pellets enter the cooler. The bypassed kiln gases are utilized for thermally balancing the system operating conditions until heat from the cooler is available. The combination of cooler heat and burner heat results in lower process gas required through the kiln. As a result, a much smaller kiln can be provided. The reinforced direct-fired grate preheater kiln system to be described can supply the additional heat to the grate preheater for accomplishing more preheating, that is calcining, which permits treating a higher temperature solid in the kiln which can be designed to hold the material at a temperature for a predetermined time for controlled alkali elimination. The system herein to be described is materially different from the aforementioned grate burners in that cooler recoup air goes to grate beds as preheated combustion air for fuel in the pellets. It also can be directed to the grate bed as preheated combustion air for fuel in pellet beds, and it provides for controlled oxygen level that is required for burning bed fuel and the system can control the quantity of combustion air that is supplied to the air heaters. Also with the present concept bypass, cooler recoup air is utilized as tempering air, and the quantity that can be used is dependent upon the bypass and cooler exhaust temperatures. The cooler recoup air also is utilized in drying as supplementary drying heat. The present system also provides controlled cooler recoup air so that excess air is bypassed to waste gas systems to dump the excess air. The cooler recoup fan speed or damper for controlling kiln firing hood is a factor in varying flow. The damper for controlling the cooler recoup excess air bypass operates to stabilize air flow in the system by varying flow to the waste gas system.

Alternately, in a grate preheater kiln for processing fuel bearing (Kerogen) raw feed materials, the preburn is modified with an updraft ignition and combustion zone. This will make up that portion of the preheat zone required for processing the amount of raw feed combustibles. Its purpose is to ignite and continue the volatilization and combustion of the volatile combustile matter.

DESCRIPTION OF THE INVENTION

Figure 1:
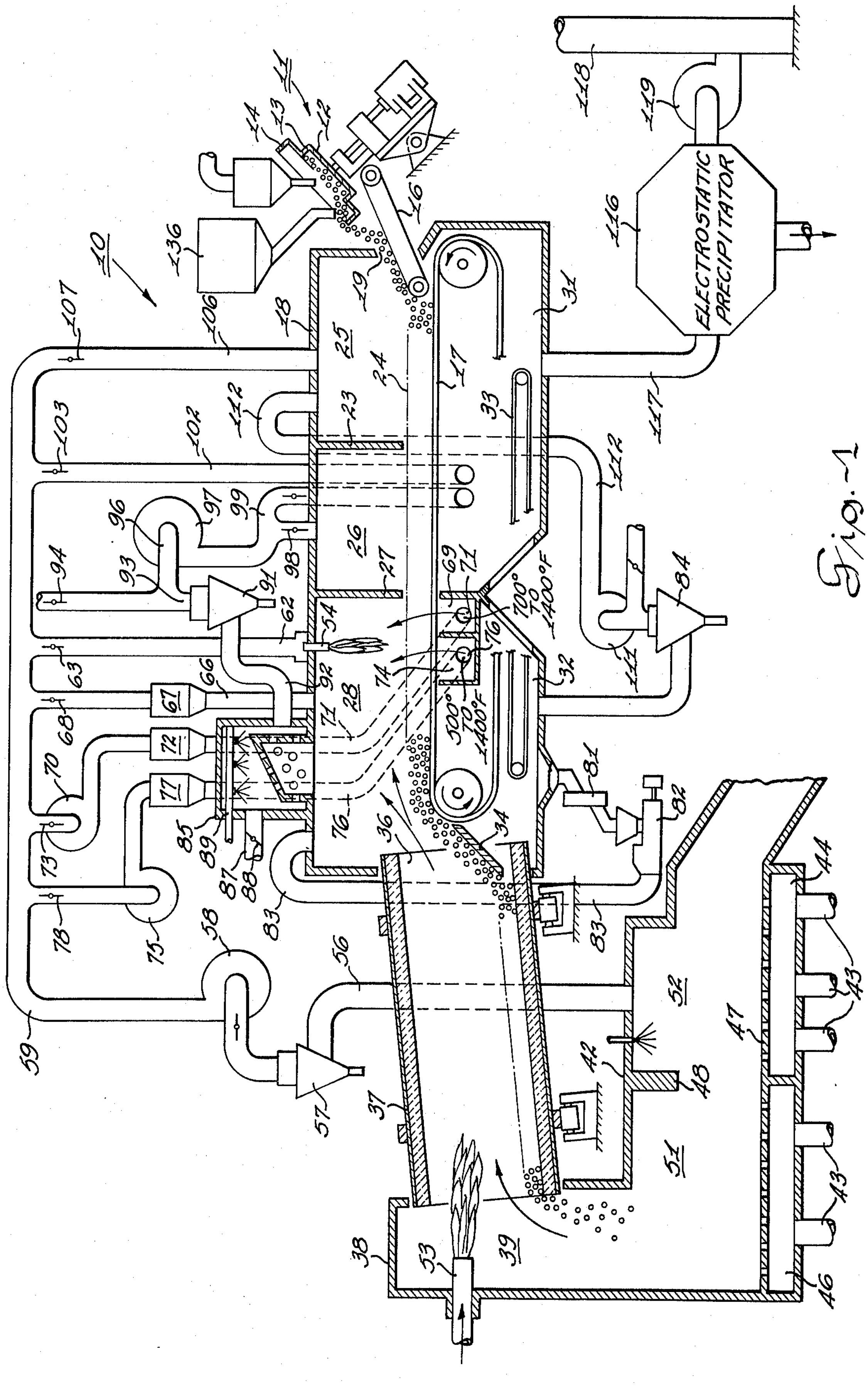
FIG. 1 of the drawings is a diagrammatic view in side elevation, partly in section, of an apparatus according to the present ivention comprising a traveling grate, preheater having a drying zone or zones and a preburning zone, a rotary kiln and a multichamber cooler, all in series-flow arrangement.

Referring to FIG. 1 of the drawings, raw material is prepared for the system 10 by a suitable agglomerating device 11 which may be a rotatably driven two-stage pelletizer pan 12 including an agglomerating inner section 13 and an outer reroll section 14. A feeder 16 receives the pellets from the reroll section of the pelletizer pan 12 and deposits them on a gas pervious traveling grate 17. A housing structure 18 is arranged to enclose a space over the traveling grate 17 and defines a material inlet opening 19. The interior of the space enclosed by the housing structure 18 is divided into a series of chambers or zones. To this purpose a baffle wall 23 is suspended from the roof of the housing structure 18 to a predetermined distance above the material bed 24 on the traveling grate 17. The baffle wall 23 thus defines a low temperature drying zone or chamber 25 and a relatively higher temperature drying zone or chamber 26. Another depending baffle wall 27 operates to separate and define a preheat zone or chamber 28 from the zone 26. Below the traveling grate 17 and the drying zones 25 and 26, there is provided a negative pressure wind box 31. Another negative pressure wind box 32 is provided below the preheat zone 28. A conveyor 33 disposed below the traveling grate 17 extends from the interior of the wind box 31 into the interior of the wind box 32. Suitable seals (not shown) are provided to close the openings in the walls of the wind boxes through which the upper run of the grate 17 travels and through the openings through which the lower run of the grate 17 and the conveyor 33 move. Thus, the material bed 24 on the grate 17 will be moved through the drying zones 25 and 26, then the preburn zone 28 and discharged down a chute 34 into an inlet opening 36 of a refractory lined rotary kiln 37.

The rotary kiln 37 slopes downwardly from chute 34 toward a hood 38 that encloses the discharge end of the kiln 37. The hood 38 defines a passage 39 connecting the discharge end of kiln 37 to a cooler 42. The downward slope of the rotary kiln 37 causes material received from the chute 34 to pass through the kiln 37, then into hood 38 and via the passage 39 into the cooler 42.

The cooler 42 is provided with blowers (not shown) that blow controlled quantities of air through suitable ducts 43 upwardly through wind boxes 44 and 46 and thence through the material on an air pervious grate 47. A baffle 48 suspended from the interior top surface of the cooler 42 divides the cooler into a first or primary cooling zone 51 and a secondary cooling zone 52. The cooling air blown into the cooler 42 flows into the passage 39. A burner 53 projects into the interior of hood 38 and serves to raise the temperature of the gases passing into the kiln 37 to raise the temperature within the kiln to the desired high level temperature required for completing the burning of the pellet material.

The present process of treating material on the grate 17 can be used successfully with material beds having fuel in the pellet bed. The cooler waste gases are recouped and directed to the preheat zone both as combustion air for the grate burner or burners and as preheated combustion air for the fuel in the material bed. As shown in FIG. 1, a burner 54 is disposed within the preheat zone 28, but the number of burners may be increased as desired. The waste gases from the final cooler zone 52 are drawn into a duct 56 which is connected to a mechanical cyclone dust collector 57 wherein the relatively large dust particles are separated and removed from the gas. A fan 58 connected between the separator 57 and a recoup supply duct 59 passes the recouped waste gases to the duct 59. A duct 62 connected between the supply duct 59 and disposed at its opposite end to surround the burner 54 directs the recouped cooler gases to the burners as preheated combustion air for the burner. For regulating the amount of preheated combustion air that is delivered to the burner 54, a damper 63 is provided in the duct 62. The damper 63 can be manually or automatically controlled as desired.

Another duct 66 connected between the recoup cooler gas supply duct 59 and the preheat zone 28 directs recouped cooler air to the preheat zone as preheated combustion air for the fuel in the pellet bed within the preheat zone. An air heater 67 is interconnected in the duct 66 and may be utilized to raise the temperature of the cooler recoup air prior to the air entering into the preheat zone. A damper 68 in the duct 66 operates to control the volume of air that is passed into the preheat zone. Such control of the level of the air supplied to the preheat zone 28 is required for the proper burning of the bed fuel. Preheated combustion air to the fuel in the pellet bed reduces the amount of fuel that the burner 54 consumes to maintain the temperature of the preheat chamber 28 between 1800° to 2500° Fahrenheit, thereby reflecting a reduction in fuel cost.

In addition, recoup cooler gas from the duct 59 is directed to a pressure chamber 69 in the wind box 32 at a location just below the upper run of the grate 17 and just to the left of the baffle wall 27. To this end, a duct 71 is connected to the cooler recoup supply duct 59 and communicates with the pressure chamber 69 within the interior of the wind box 32 just below the grate 17 on which the material bed is carried and to the left of the baffle wall 27. A fan 70 develops the necessary pressure to the pressure chamber 69 to force gas flow up through a controlled area of the pellet bed. The gas flow thus obtained through the material bed volatilizes the fuel in the material bed. A heater 72 is interconnected in the duct 71 and may be utilized to raise the temperature of the cooler recoup gases being directed to the preheat wind box 32. A damper 73 operates to control the volume of the cooler recoup gases supplied to the wind box 32 via the duct 66.

Cooler recoup gases are also directed to a pressure chamber 74 in the preheat wind box 32 at a location to the left of the area to which the duct 71 directs the cooler recoup gases. To this end, a duct 76 is connected to the cooler recoup gas supply duct 59 and has communication with the pressure chamber 74 in the interior of the wind box 32 at a position to the left of the pressure chamber 69 to which the duct 71 directs the recouped gas. A fan 75 develops the necessary pressure to the pressure chamber 74 to force gas flow up through a controlled area of the pellet bed. The duct 76 is also provided with a heater 77 which is operable to raise the temperature of the gases passing through it to a desired temperature level. A damper 78 in the duct 76 operates to regulate the volume of recouped gas passed through duct 76 to pressure chamber 74.

The cooler recoup gas that may be supplied to the wind box 32 is especially useful to maintain combustion of the pellet bed material when such material is of the Kerogen type such as oil shale material. With this type of material, it has been found highly desirable to maintain combustion of the pellet bed to ensure that the contained fuel is substantially all consumed. Thus, the cooler recoup gases supplied via the duct 71 is raised to a temperature level by means of the heater 72 wherein the area of the material bed as it enters the preheat zone 28 will be at up to 1400° Fahrenheit. This will elevate the temperature of the material as it leaves the drying zone 26 which is at a temperature level of up to 800° Fahrenheit. As a result, the burning of the fuel in the material will take place aiding in the calcining of the material.

As the material bed progresses from right to left, it is desirable to maintain combustion for an additional period to ensure that the fuel in the material of the bed is substantially all consumed. To this purpose, the temperature of the recouped gas supplied via the duct 76 is elevated by the heater 77 to a temperature level of between 500° to 1400° Fahrenheit as may be necessary to maintain the volatilization and combustion of the fuel material. The supplemental combustion is maintained only over a limited area sufficient to ensure the consuming of substantially all of the material fuel.

In some instances, the kiln off-gases to the preheat zone 28 can be high in sulfur and alkalies with the gaseous sulfur exceeding the level that can react with or tie-up with alkalies. Then an excess of gaseous sulfur in the gas from preheat zone 28 conventionally bypassed to the drying zone 21 or to the waste gas exists and presents a problem since present environmental standards prescribe maximum sulfur in waste or stack gases. Thus, an efficient means must be provided to reduce the sulfur in the waste gas to stack. With the conventional bypass, the potential of the sulfur going through the drying bed in the drying zone and through a waste duct collector is great. Also, when the preheat on-gas contains sulfur, an internal sulfur cycle develops which will prevent the desired reduction of sulfur in the kiln product.

To alleviate the sulfur problems, the sulfur gases to the preheat zone 28 are treated with a material which is chemically reactive with sulfur, such as lime bearing dust. The lime bearing dust is material collected from the wind boxes 31 and 32 below the drying zones and the preheat zone. Included in these collected materials are the pellets and fines which back spill from chute 34.

Sulfur oxides ($SO_2$ and $SO_3$) have a strong affinity for free lime at temperatures generally above 500° and up to 2200° Fahrenheit and readily form gypsum anhydrite ($Ca\ SO_4$). The gypsum anhydrite that is formed in the calcined material bed is processed through the kiln 37. The high lime bearing material from the wind boxes 31 and 32 is recycled and blown into the kiln off-gas stream to add lime bearing fines with which the sulfur in the kiln off-gas will combine and can be removed.

To this end, the lime bearing material from the preheat zone and also from the drying zones which pass through the traveling grate 17 are collected on the lower conveyor 33 and the pellets and fines are passed to a pulverizer 81 and thence to an elevating device, such as pneumatic pump 82. The collected and pulverated dust from the pump 82 is directed back to the preheat zone 28 via a duct 83, and is dropped, in a substantially transverse vertical path, into the upsweeping kiln off-gas stream flowing into the preheat zone 28. Thus, the recycled dust from the pump 82 has a better potential for being more completely calcined and thus be reactive with the sulfur in the kiln off-gases. A portion of this calcined dust will pass through material bed on the grate 17 and will be pulled out by a cyclone separator 84 in the form of gypsum anhydrite.

A portion of the kiln off-gases in the preheat zone 28 which contains a substantial amount of reacted and calcined dust added to the kiln off-gases via the duct 83 are drawn into a ported cage mixing box 85 and tempered with a controlled volume of ambient air. To this end, an ambient air duct 87 having a control damper 88 therein is in communication with the interior of the mixing box 85. A moisturizing means in the form of water sprays 89 may be used to moisturize the mixed gases in mixing box 85 as required. The tempered mixed gases include the reacted calcined dust particles and the relatively larger particles of this calcined dust, which are substantially free lime in the form of gypsum anhydrite, are passed into a cyclone separator 91 via an interconnecting duct 92. The dust particles removed by the separator 91 are salvaged as a potentially commericially usable by-product. The relatively clean gases from the cyclone separator 91 pass into a duct 93 which includes a volume control damper 94 which regulates the volume of the relatively clean gas that is drawn into a connecting duct 96 by a fan 97. The tempered and cleansed gases which still contain some free lime particles in the form of gypsum anhydrite is directed into the high temperature drying zone 26 via a duct 98. Thus, the tempered gas from the mixing box 85 provides the elevated temperature within the high temperature drying zone 26 to complete the drying process with pellet beds that are deeper than 6 inches. This gas is supplied at a temperature level up to 800° Fahrenheit and thus reduces the need for additional burners.

In addition, a portion of the mixed cleansed gases from the mixing box 85 is passed to the wind box 31 via a duct 99 to combine with the low temperature drying zone 26 off-gases. This will result in a beneficial reduction in the drying off-gas volume and thus reduce the need for additional waste gas cleaning equipment.

In addition, a portion of the cooler recouped gas is also directed into the wind box 31 via a duct 102 to combine with low temperature drying zone off-gas and mixing box gases and serve as elevating air to blend with the relatively low temperature off-gases from the drying zone. The mixing of the cooler gases with the other gases in the wind box 31 serves to raise the temperature of the waste gases to a level of about 250° Fahrenheit or above. This reduces the formation of sulfur acids to an acceptable level. A damper 103 in the duct 102 is operative to control duct pressure by varying the flow through the duct 102 to the wind box 31 or waste gas system.

Excess cooler recoup gas is usable as supplementary drying heat in the low temperature drying zone 25. To this end, cooler recoup air from supply duct 59 is directed via a duct 106 to the drying zone 25. The volume of the recouped cooler gas passed into zone 25 is controlled by means of a damper 107. The damper 103 is operable to stabilze the cooler recoup system. The recouped cooler gas passed to the zone 25 mixes with hot off-gases from the wind box 32. As previously mentioned, the waste gases from the wind box 32 contains calcined dust in the form of gypsum anhydrite of which the larger particles are separated out by the cyclone separator 84. A fan 111 draws the gas from the separator 84 and passes it via a duct 112 into the low temperature drying zone 25 where it is combined with recoup cooler gases entering the zone 25 via the duct 106. The waste gas drawn from the separator 84 has relatively small particles of gypsum anhydrite which pass through the pellets on the material bed of the grate. The gases directed into the low temperature drying zone 25 add a substantial amount of heat to the zone to maintain the zone at a temperature level of between 400° to 600° Fahrenheit thereby realizing a reduction in combustion fuel that is burnt to maintain the temperature level.

The tempered waste gases from the wind box 31 are drawn into an electrostatic or bag house precipitator 116 through a duct 117. The precipitator 116 removes the relatively small dust particles from the gas and passes to the waste stack 118. A fan 119 is operatively interconnected between the precipitator 116 and stack 118 to draw the gas from the wind box 31 and pass it to the waste stack.

Figure 2:
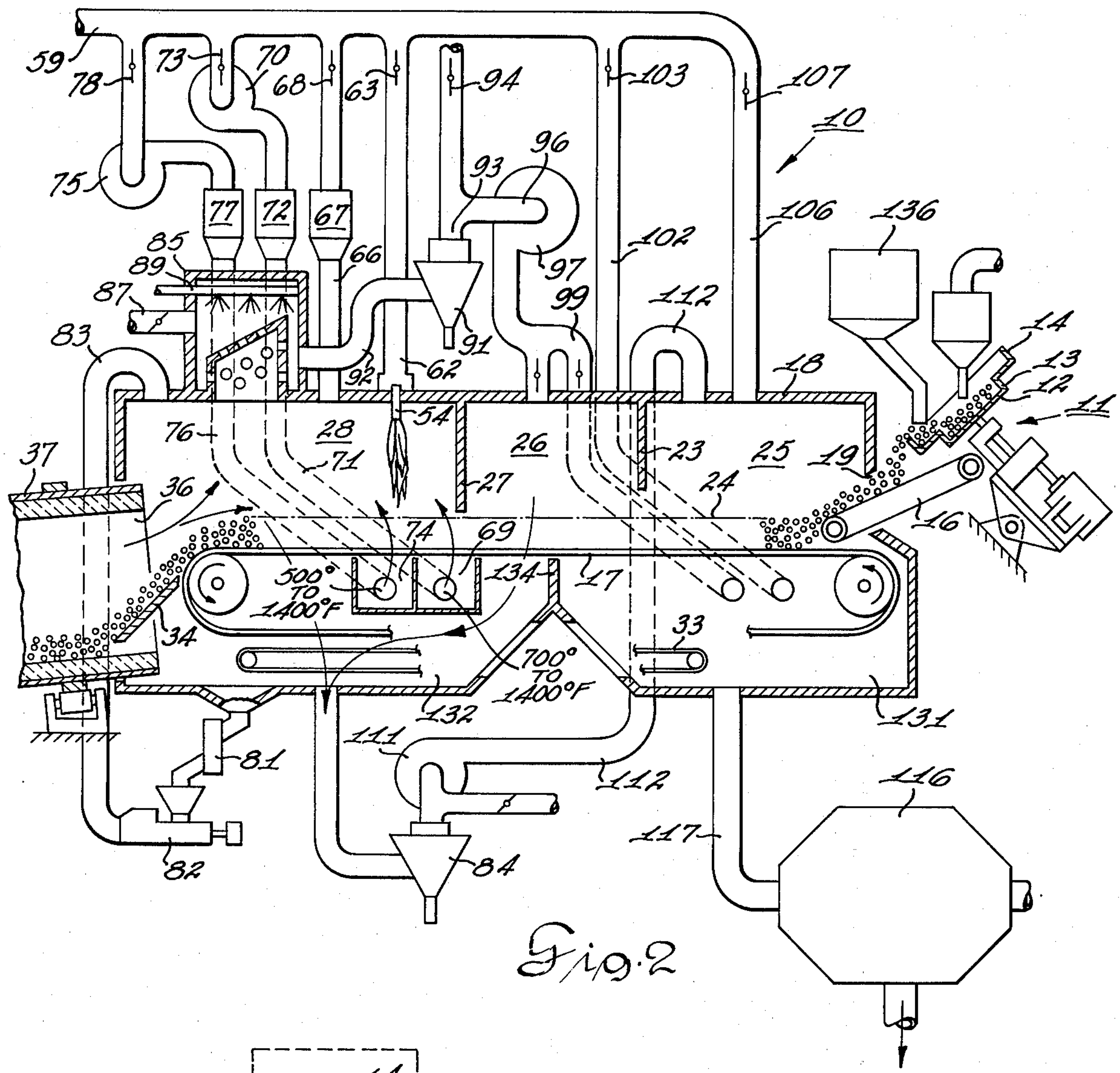
FIG. 2 is a diagrammatic view in side elevation, partly in section, of a modification of the apparatus of FIG. 1 wherein a portion of the drying chamber off-gases are utilized as tempering air of the preheat off-gases supplied to the drying zone.

In FIG. 2, a modification of the system disclosed in FIG. 1 is shown. The system of FIG. 2 varies from the system of FIG. 1 in that the wind boxes 131 and 132 are constructed and arranged in a manner that their common dividing wall 134 is located below the high temperature drying zone 26 a distance to the right of the baffle wall 27, which distance is approximately one bay. For example, assuming that the drying zones 25 and 26 comprise a ten-bay arrangement, the common dividing wall 134 between the wind boxes will be located so that the wind box 131 will be a nine-bay wind box. Similarly assuming that the preheat zone 28 is a five-bay zone, the common dividing wall 134 will be located in a manner that the wind box 132 will be six-bays in length.

With the wind boxes 131 and 132 constructed and arranged as described, approximately 10–25 percent of the off-gases from the drying zones 25 and 26 are recirculated to the preheat off-gas which substantially reduces the amount of ambient air bleed in to the preheat off-gases and reduces the need for moisturizing water to the bypass system. This arrangement provides the benefits of reducing fuel consumption by 5 to 10 percent and lowers the waste gas volume by 5 to 15 percent.

Raw material is agglomerated in the bottom or first section 13 of the rotating pelletizer pan 12. As the agglomeration of the pellets progresses, the larger pellets move to the reroll section 14 wherein the pellets are densified still further. Before the densified pellets progress from the reroll section 14 onto the feeder 16 and are deposited on the traveling grate 17, the pellets in the reroll section 14 may be coated with a solid fuel to provide the required bed fuel. Alternately, solid fuel from a supply bin 136 is added to the pellets in the reroll section 14 of the pelletizer pan 12 to coat the pellets with an optimum of fuel.

Agglomerate material to be processed through the systems herein described may be supplied to the pelletizer pan 12 as new material or may be a blend of new raw material and waste dust from a source or may be entirely all waste dust. The waste dust from the source 136, such as a collecting hopper, is fed to a blender 137 where it is blended with new raw material. The blended agglomerate is fed to a hopper 138 from whence it is directed into the pelletizing pan 12.

Figure 4:
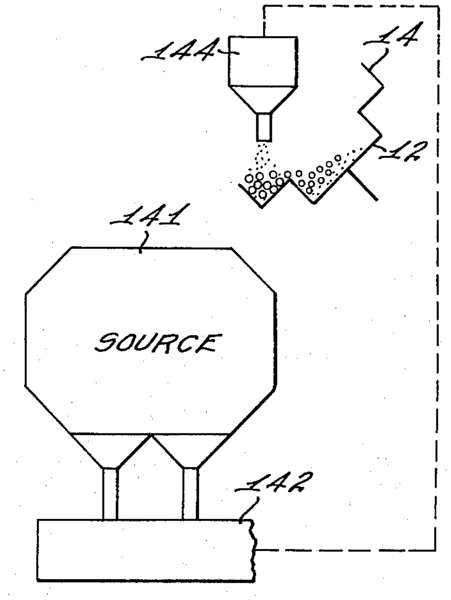
Figure 3:
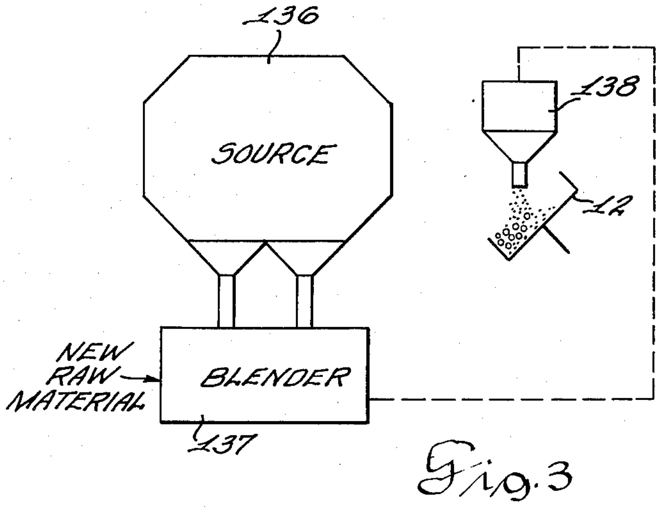
FIG. 3 is a diagrammatic view of a source of material for processing through the system; and, FIG. 4 is a diagrammatic view of another source of material for processing through the system.

Alternately, the agglomerate can be from a source 141 which is fed to a feeder 142 which directs the agglomerate into a hopper 144. The agglomerate in the hopper 144 may be mixed with fuel and the combined mixture directed into the reroll section 14 of the pelletizer 12 as illustrated in FIG. 4.

The embodiments of the invention in which an exclusive property or privelege is claimed are defined as follows:

1. In a method of heat treating material including steps in which the material is fed successively through a drying zone having a negative pressure off-gas windbox, a preheat zone having a negative pressure off-gas windbox, a final heating zone and a cooling zone, a burner means for accomplishing elevating the temperature in the preheat zone to effect a reduction in the heat required in the final heating zone which results in a higher cooler off-gas temperature which is usable for drying, comprising the steps of:

A. passing recouped cooler gases with a fan means to the drying zone as supplementary drying heat; and, B. bypassing a regulated amount of recouped cooler gases to the negative pressure side of the drying zone to stabilize the operation of the cooler recoup system which operates to stabilize the pressure in the final heating zone and the pressure in the drying zone and also aids in raising the temperature of the drying zone off-gases in the associated windbox.

2. A process according to claim 1 including the steps of:

A. directing final heating zone off-gases into the preheat zone;

B. adding a quantity of material which is chemically reactive with sulfur to the final heating zone off-gases in the preheat zone;

C. mixing tempering air with the bypassed final heating zone off-gases that have been treated with the chemical sulfur reactive material;

D. passing the tempered mixed gases through a dust collector to remove the relatively large dust particles from the tempered mixed gases; and, E. directing a portion of the tempered mixed gases into the drying zone.

3. A process according to claim 2 including the step of:

A. moisturizing the tempered bypass preheat gases to improve the efficiency of the electrostatic precipitator and to reduce bypass gas volume; and, B. directing a portion of the tempered moisturized mixed bypass gases into the negative pressure side of the drying zone to raise the temperature of the waste gases in the negative pressure side of the drying zone to an acceptable temperature level above dew point before it is discharged to a waste stack.

4. A process according to claim 1 including the steps of:

A. recouping a portion of the off-gases from the negative pressure side of the drying zone;

B. mixing the portion of the recouped gases of step A as tempering air with preheat off-gases; and, C. recirculating the mixed gases of step B to the drying zone as usable heat to improve the thermal efficiency of the system by the more efficient use of heat which is normally wasted and to lower waste gas volume and upgrade the moisture content in the waste gas that is directed to a waste gas precipitator.

5. In a method of heat treating material having fuel associated with it including steps in which the material is fed successively through a drying zone having a negative pressure off-gas windbox, a preheat zone having a negative pressure off-gas windbox and provided with an auxiliary burner means, a final heating zone and a cooling zone, a system in which gases from the preheat zone are pulled through the material feeding through the preheat zone and delivers the gases to the drying zone as drying heat, a bypass system including mixing means wherein gases from the final heating zone are mixed with tempering air and are passing through the preheat zone, directed to the drying zone, comprising the steps of:

adding a portion of recoup cooler gases to the preheat zone for supplying a controlled level of oxygen as combustion air for the burning of fuel associated with the material feeding through the preheat zone.

6. A process according to claim 5 including the step of:

supplying pressurized preheated cooler recouped air to the negative pressure preheat wind box for movement through the material bed to volatilize the fuel in the material bed.

7. A process for treating material according to claim 5 including the step of:

heating the cooler recouped air to elevate the temperature thereof prior to the cooler recoup air being added to the preheat zone as preheated combustion air for the fuel associated with material on the grate.

8. A process according to claim 5 including the steps of:

A. recouping a portion of the off-gases from the negative pressure side of the drying zone;

B. mixing the portion of recoup off-gases of step A as tempering air with preheat off-gases; and, C. recirculating the mixed gases of step B to the drying zone as usable heat to improve the thermal efficiency of the system by the more efficient use of heat which is normally wasted and to lower waste gas volume and upgrade the moisture content in the waste gas which is directed to a waste gas precipitator.

9. A process according to claim 5 including the steps of:

A. directing final heating zone off-gases into the preheat zone;

B. adding to quantity of material which is chemically reactive with sulfur to the final heating zone off-gases in the preheat zone;

C. bypassing the final heating zone off-gases to which material that is chemically reactive with sulfur has been added to a mixing zone;

D. mixing tempering air with the treated bypass gases in the mixing zone;

E. passing the treated tempered bypass gases through a dust collector to remove dust particles; and, F. directing a portion of the bypass gases which have passed through the dust collector into the drying zone;

whereby sulfur in the final heating zone off-gases combines with the added material that is chemically reactive with sulfur to form gypsum anhydrite which is removed from the gases in the dust collector and the cleaned gases are utilized as heat in the drying zone.

10. A process according to claim 9 including the steps of:

A. moisturizing the tempered bypass gases from the preheat zone in the mixing zone to improve the efficiency of the electrostatic precipitator and to reduce the volume of the bypass gas; and, B. directing a portion of the tempered moisturized mixed gases into the negative pressure side of the drying zone to raise the temperature of the waste gases in the negative pressure side of the drying zone to an acceptable temperature level above dew point before it is discharged to a waste stack.

11. In the method of heat treating material including steps in which the material is fed successively through a low temperature drying zone, a high temperature drying zone, said low and high temperature drying zones having a negative pressure off-gas windbox, a preheat zone having a negative pressure off-gas windbox and burner means, a final heating zone, a cooler zone and having a system in which gases from the preheat zone are pulled through the material feeding through the preheat zone and delivers the gases to the low temperature drying zone as drying heat, comprising the steps of:

A. passing a portion of recouped cooler gases to the preheat zone as combustion air for the burner of the preheat zone;

B. passing a portion of recoup cooler gases to the low temperature drying zone as supplementary drying heat;

C. passing a regulated amount of recoup cooler gases to the low temperature drying zone off-gas windbox to stabilize the recoup cooler gas system; and, D. mixing gases from the preheat zone and the final heating zone and passing a portion of the mixed gases to the high temperature drying zone to accelerate the rate of drying of the material feeding through the high temperature drying zone.

12. In a mineral furnacing apparatus having structure defining a chamber having at least a low temperature drying zone and a high temperature drying zone for preconditioning material having a material inlet opening, the drying chamber having a negative pressure off-gas windbox, a chamber for preheating material, the preheat chamber having a negative pressure off-gas windbox, a burner in the preheat chamber, a chamber for final heating material having a material inlet opening adjacent the preheating chamber and having a material outlet opening and at least one cooling chamber having a material inlet opening adjacent the material output opening of the final heating chamber, the chambers being connected together in series flow arrangement to define a material flow stream from the preconditioning chamber to the preheating chamber, to the final heating chamber and thence to cooling chamber with the final heating chamber and the preheating chamber defining a passage for a counterflow of gas from the final heating chamber to the preheating chamber, and gas conveying means comprising:

a supply duct including a fan connected to receive recoup gases from the cooler zone;

a first duct means connecting said recoup cooler gas supply duct to the preheat zone for directing a portion of recoup cooler gases to the preheat zone as combustion air for the burner in the preheat zone;

a second duct means connecting said recoup cooler gas supply duct to the low temperature zone of the drying chamber for directing the recoup cooler gases into the low temperature dry zone as supplementary drying heat;

a third duct means connecting said recoup cooler gas supply duct to the negative pressure windbox of the drying chamber;

a damper in said third duct operable to regulate the volume of recoup cooler gases to the negative pressure windbox of the drying chamber for stabilizing the pressure in the recoup cooler gas system and also to stabilize the pressure in the final heating chamber and the pressure in the drying chamber;

means for mixing gases from the final heating chamber and from the preheat chamber; and, means including a dust collector and a fan connected to draw the mixed gases from said gas mixing means and to direct the mixed gases to the high temperature drying zone of said drying chamber to accelerate the rate of drying of the material flowing therethrough.

13. A mineral furnacing apparatus according to claim 12 wherein there is also provided:

moisturizing means in said gas mixing means for moisturizing the mixed gases;

duct means connected to receive and direct the moisturized mixed gases to the negative pressure windbox of said drying chamber; and, an electrostatic precipitator connected to receive waste off-gases from the negative pressure windbox of the drying chamber;

whereby the moisturized mixed gases operate to improve the efficiency of the electrostatic precipitator and to reduce the volume of the gases directed to the windbox.

14. In a furnacing apparatus for treating material having fuel associated with it having structure defining a chamber having at least a low temperature drying zone and a high temperature drying zone for preconditioning material having a material inlet opening, the drying chamber having a negative pressure off-gas windbox, a chamber for preheating material, the preheat chamber having a negative pressure off-gas windbox, a burner in the preheat chamber, a chamber for final heating material having a material inlet opening adjacent the preheating chamber and having a material outlet opening and at least one cooling chamber having a material inlet opening adjacent the material output opening of the final heating chamber, the chambers being connected together in series flow arrangement to define a material flow stream from the preconditioning chamber to the preheating chamber, to the final heating chamber and the preheating chamber defining a passage for a counterflow of gas from the final heating chamber to the preheating chamber, and gas conveying means comprising:

a supply duct including a fan connected to receive recoup cooler gases from the cooler chamber;

a first duct connecting said recoup cooler gas supply duct to the preheat chamber; and, a control damper in said first duct operable to control the volume of recoup cooler gases to the preheat chamber, wherein a controlled level of oxygen is supplied to the preheat chamber as combustion air for the burning of the fuel associated with the material being treated in the preheat zone.

15. A furnacing apparatus according to claim 14 wherein there is provided:

a combustion chamber interposed in said first duct to elevate the temperature of the recoup cooler gases prior to the recoup cooler gas being supplied to the preheat chamber.

16. A furnacing apparatus according to claim 14 including:

means for collecting material which is chemically reactive with sulfur from the negative pressure windbox of the preheat chamber;

second duct means connecting said collecting means with the preheat chamber;

means in said second duct means to move the collected material which is chemically reactive with sulfur through said duct means in manner that the material is dropped into the counterflow gas stream from the final heating chamber within the preheat chamber so that the collected materials will react with sulfur in the gases flowing from the final heating chamber to form gypsum anhydrite which may be removed;

gas mixing means having communication with the preheat chamber and adapted to receive the treated gases;

a source of tempering air connected into said gas mixing means to temper the treated gases;

a dust collection connected to receive the treated gases for recovering dust particles from the treated gases;

third duct means including a fan operably connected to receive and direct the filtered treated gases into the drying chamber;

a fourth duct means operably connected to receive a portion of the filtered gases treated from said third duct means and to direct the received portion into the negative pressure windbox of the drying chamber to raise the temperature of the waste gases in the windbox to an acceptable level above acid dew point before the waste gas is passed to atmosphere.

17. A furnacing apparatus according to claim 14 including:

a chamber within said preheat chamber negative pressure windbox, said chamber being located in close proximity to the underside of the material flow stream and having communication therewith;

a duct interconnecting said recoup cooler gas supply duct with said chamber;

a fan in said duct to deliver the recoup cooler gases from the supply duct to said chamber and for forcing the recoup cooler gases through the material stream flowing through the preheat chamber as combustion air to volatilize the fuel in the material bed.

18. A furnacing appparatus according to claim 17 wherein there is provided:

a combustion chamber in said duct that is interconnected between said supply duct and said chamber, said combustion chamber being operable to elevate the temperature of the recoup cooler gases prior to the recoup cooler gases being forced through the material stream.

19. In a furnacing apparatus for heat treating material having fuel associated with it and having structure defining a chamber having at least a low temperature drying zone and a high temperature drying zone for preconditioning material having a material inlet opening, the drying chamber, a chamber for preheating material, the preheat chamber, a burner in the preheat chamber, a chamber for final heating material having a material inlet opening adjacent the preheating chamber and having a material outlet opening and at least one cooling chamber having a material inlet opening adjacent the material output opening of the final heating chamber, the chambers being connected together in series flow arrangement to define a material flow stream from the preconditioning chamber to the preheating chamber, to the final heating chamber and thence to cooling chamber with the final heating chamber and the preheating chamber defining a passage for a counterflow of gas from the final heating chamber to the preheating chamber, and gas conveying means comprising:

a preheat chamber negative pressure off-gas windbox associated with the preheat chamber, said preheat negative off-gas pressure windbox extending under the preheat chamber and an adjacent portion of the drying chamber;

a drying chamber negative pressure off-gas windbox extending under the remaining portion of the drying chamber;

a duct connected to the preheat chamber windbox and to the drying chamber;

a dust collector interposed in said duct;

a fan interposed in said duct between said dust collector and the drying chamber, said fan being operable to draw gases from the drying chamber through the portion of the preheat chamber windbox that extends under the drying chamber into the preheat negative pressure windbox where the drying chamber off-gases mix with the preheat off-gases as tempering air, said fan directing the mixed gases to the drying chamber as usable heat to improve the thermal efficiency of the furnace by the more efficient use of heat which is normally wasted and to lower waste gas volume.

* * * * *